Aug. 24, 1965     T. F. CARMICHAEL ETAL     3,202,592
INDUCTANCE-CAPACITANCE DEVICE AND METHOD OF MANUFACTURE
Filed Aug. 3, 1960
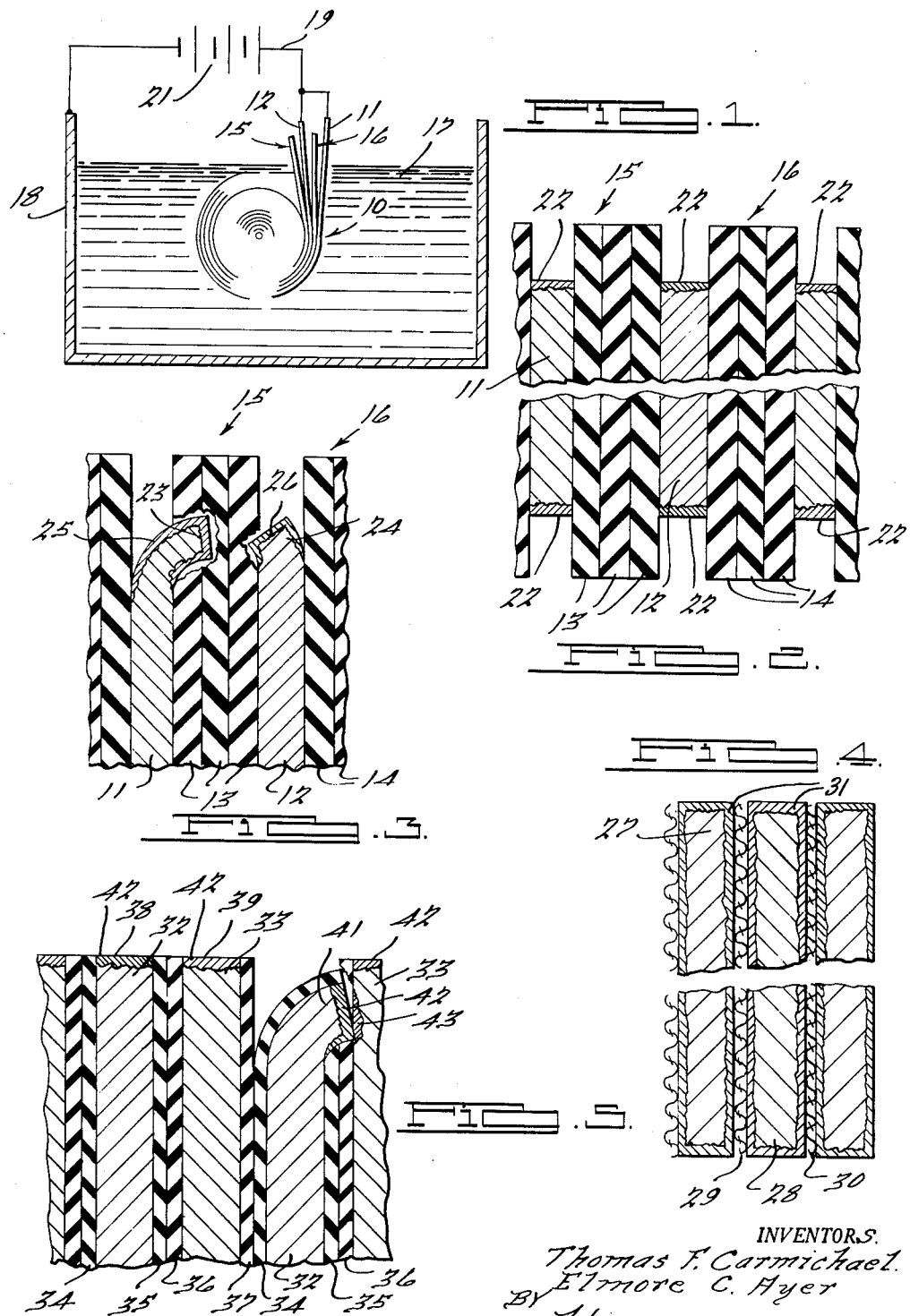
INVENTORS.
Thomas F. Carmichael.
Elmore C. Ayer
BY Harness, Dickey & Pierce
ATTORNEYS.

United States Patent Office 3,202,592
Patented Aug. 24, 1965

3,202,592
INDUCTANCE-CAPACITANCE DEVICE AND METHOD OF MANUFACTURE
Thomas F. Carmichael, Plymouth, Mich., and Elmore C. Ayer, Bryan, Ohio, assignors to Syncro Corporation, Oxford, Mich., a corporation of Michigan
Filed Aug. 3, 1960, Ser. No. 47,310
1 Claim. (Cl. 204—58)

This invention relates to inductance-capacitance devices and their methods of manufacture, and more particularly to devices which utilize thin strips of metallic foil wound in overlapping spiral fashion with some form of dielectric separting means.

The use of foil strips, more particularly aluminum foil, in dielectric type capacitors, or inductance-capacitance devices of this nature has been found very beneficial because of the high capacitance and voltage ratings achievable in a compact space. However, problems have arisen with respect to the insulative or dielectric material used in such coils. When layers of paper or other dielectric separators are used between the strips, the strip edges may readily bend over or cut through the separator edges during or after the coiling process, thus creating short circuits between the turns. When anodized aluminum is used for the foil strips, minor abuses in handling or even during the coiling process are apt to fracture the anodized coating, especially if thin foil in the order of 0.00025" is used. Even if paper or other dielectric separators are relied on in addition to the anodized coatings, the fracturing of such coatings greatly reduces the dielectric strength and the voltage difference at which failure could occur. For example, it has been estimated that in a capacitor using two anodized aluminum foil strips and a typical paper separator, each anodized coating has approximately as much dielectric strength as the separator. A fracture in one of the anodized coatings would thus reduce the dielectric strength at that point of the device by one-third.

It is an object of the present invention to overcome the disadvantages of previously known constructions and methods of making inductance-capacitance devices of the above described nature, and to provide novel and improved constructions and manufacturing methods which will insure the maintenance of proper dielectric strength in the coil while it is being wound and during its useful life.

It is another object to provide an improved construction and method of this type which is economical and involves no special equipment or manufacturing techniques.

Other objects, features, and advantages of the present invention will become apparent from the subsequent description, taken in conjunction with the accompanying drawings.

In the drawings:

FIGURE 1 is a schematic presentation of an anodizing tank and a coiled inductance-capacitance device incorporating aluminum strips, illustrating the novel method of manufacture;

FIGURE 2 is an enlarged fragmentary cross-sectional view of a coil constructed in accordance with the present invention, showing the anodized edges of the aluminum foil strips between the dielectric separators;

FIGURE 3 is a fragmentary cross-sectional view similar to FIGURE 1, showing the manner in which the novel method increases the dielectric strength between adjacent foil turns when the foil edges have cut through the separators;

FIGURE 4 is a fragmentary cross-sectional view of a coil showing a modified form of the invention by means of which the entire surfaces of the foil strips may be anodized after the coil is wound by the use of a porous dielectric separator; and FIGURE 5 is a fragmentary cross-sectional view of a modified coil made of strips previously coated with a dielectric substance, illustrating the manner in which the invention corrects a shorted condition between adjacent strips resulting from a fracture in the dielectric material.

In general terms, the invention comprises an inductance-capacitance device made by coiling a plurality of metallic strips, such as aluminum, in overlapping spiral fashion and with some form of dielectric separator between adjacent strips, and then connecting the strips as the anode in an electrolytic anodizing operation. The anodization process creates an anodized coating or film on all surfaces of the aluminum strips with which the anodizing bath comes into contact. Since the anodizing is performed after the coil has been wound, the possibility of cracks or fractures occurring in the anodized film afterwards will be substantially reduced. Moreover, any short circuiting or reduction in voltage strength between adjacent turns, which may have been caused by bending of foil edges or fractures in dielectric coatings, will be corrected by the anodization process, so that the coil will be restored to its intended usefulness.

Referring more particularly to the drawings, a coil of the type under consideration is indicated generally at 10 in FIGURE 1. This type of coil comprises a plurality of thin metallic strips or foils, two such foils 11 and 12 being indicated in FIGURE 2. Such foils, wound in overlapping spiral fashion and separated by such means as dielectric separating sheets 13 and 14, are in widespread use as capacitors, transformers, and in other types of applications requiring either capacitance alone or capacitance and inductance properties.

According to the invention, coil 11 is first wound in a conventional manner, it being noted that the dielectric separators (in two groups indicated generally at 15 and 16 in FIGURE 1) are somewhat wider than the foils 11 and 12, in accordance with standard practice. The wound coil 11 is then placed in an anodizing bath 17 within a tank 18, the strips 11 and 12 being connected to the anode 19 of battery 21, tank 18 acting as the cathode.

The anodization process will produce anodized coatings or films on all areas of the strips 11 and 12 with which electrolyte 17 comes into contact. In FIGURE 2, these coatings are indicated at 22 as being on the edges of foils 11 and 12. This is assuming that the main areas of the foils are in such intimate contact with their adjacent separators 13 or 14 that anodization does not take place on these main surfaces.

Such intimate contact is not the general rule, and some areas of the interiors of foils 11 and 12 will be anodized. FIGURE 3 illustrates however a main function of the invention which pertains to edges of strips 11 and 12 which may have become bent during the winding process or subsequent handling, or which are distorted due to roughness, burrs or other irregularities.

Two such edges 23 and 24 are illustrated as being on foils 11 and 12, respectively, in FIGURE 3. Edge 23 is shown as having been bent in such a fashion as to tear two separators 13 of group 15, these separators commonly being fabricated of a paper-like material. Edge 24 of foil 12 is likewise indicated as having torn into the third separator 13 of group 15 and toward edge 23.

In this case, therefore, the result would be that the dielectric or voltage strength of this portion of the coil would be greatly reduced, since there is approximately a thickness of only one paper separator separating these foil edges. If, in accordance with the invention, the completely wound foil is subjected to an anodization process, anodized coatings 25 and 26 wil be formed on edges 23 and 24, respectively. As was indicated above, it has been found that a rather thin coating of anodization will create quite a high voltage strength, and in the example illustrated, the result will be that the dielectric or voltage strength will be restored approximately to what would have been the case had the edges remained unbent.

The anodized coating will cover not only the outer edges of the foils but all other areas which come into contact with the electrolytic solution due to irregularities in the coil convolutions. The process would also cure or correct any actual short circuit between adjacent strips which could occur if one or the other completely penetrates the separators and comes into contact with its adjacent coil. This is because the contacting aluminum surfaces would become anodized, disrupting the electrical connection. This feature of the invention is described more fully with respect to FIGURE 5, since it has been found that actual short circuiting is not as likely to occur in constructions of the types shown in FIGURES 2 and 3 as in the FIGURE 5 construction.

FIGURE 4 illustrates another embodiment of the invention in which coils or strips 27 and 28 are separated by separators 29 and 30 which are of a porous or foraminous nature, such as would permit the electrolytic solution 17 to come into contact with the entire surfaces of both strips. Such a separator could be fabricated of any of a number of synthetic or fabric materials, and the anodization would as before be performed after the coil is completely wound. The result would be a coil having the desired dielectric strength as created by the presence of two anodized layers 31 and one or more separators 29 or 30 between adjacent turns. The coil would moreover not be subject to reduction of its dielectric or voltage strength due to cracking or fracturing of the anodized layer since, as previously, the anodization is performed after the coil is wound.

The constructions shown in FIGURES 2, 3 and 4 could be used in conjunction with known impregnating methods, whereby an impregnating material of dielectric properties is applied to and absorbed by the separators 15 and 16 or 29. The addition of such impregnants is for the purpose of gaining additional capacitance and mechanical strength. The present invention will not interfere in any way with the subsequent use of such impregnating material. In fact, the anodized coatings created in accordance with the invention will insure proper dielectric strength in cases where the impregnant may not completely penetrate or be absorbed by the separators.

FIGURE 5 illustrates a third manner in which the invention may be carried out. The foils 32 and 33 in the embodiment of FIGURE 5 are of a type which have been coated before winding with a film or layer of dielectric material which adheres to the foil surface. Materials used for this purpose are epoxy resins and polyester films such as Mylar, manufactured by the Du Pont Corporation. The coatings are conventionally applied to large sheets of the aluminum foil, and after drying, the sheets are cut into strips of the proper width for winding the foils. Coatings 34, 35, 36 and 37 are shown on coils 32 and 33, respectively in FIGURE 5. In cutting the sheets into foil strips, the strip edges 38 and 39 of foils 32 and 33, respectively, will be exposed and not covered by the dielectric film which had previously been applied. Under former coil manufacturing methods, the possibility of short circuiting between adjacent coils was quite substantial, since the dielectric separators did not extend beyond the strip edges, as in the case of FIGURES 2 and 3, and were in any case relatively thin. Bending of the edge, such as the edge 41 of strip 32 shown in FIGURE 5, could easily cause this edge to rupture the adjacent film 36 on strip 33, causing the adjacent turns of strips 32 and 33 to come into contact.

According to the novel method of this invention, the completely wound foil shown in FIGURE 5 is subjected to the anodization process. Layers 42 of anodized material will thus be formed on all exposed edges 38 and 39 of coils 32 and 33, respectively. In the case of bent edge 41, this layer will be formed around the entire exposed edge including that portion in contact with strip 33. Moreover, the zone 43 of strip 33 which was exposed by fracturing insulative layer 36 will likewise become anodized. The short circuit will thus be eliminated and the coil restored to its desired strength. As before, the chances of subsequent cracking or fracturing of the anodized film will be greatly reduced since the anodization will be performed after the coil is wound.

While it will be apparent that the preferred embodiments of the invention disclosed are well calculated to fulfill the objects above stated, it wil be appreciated that the invention is susceptible to modification, variation and change without departing from the proper scope or fair meaning of the subjoined claim.

What is claimed is:

In a method of manufacturing an inductance-capacitance unit, the steps of placing a pair of metallic foil strips and porous dielectric separators between said strips in overlapping relation, winding said strips and separators to form a coil, connecting the metallic strips in an anodizing circuit by placing the coil in an anodozing bath within a tank, connecting both strips to one side of a direct current source to act as an anode, and connecting said tank to the other side of said source to act as a cathode, and anodizing both of said strips in the wound coil to create anodized coatings in the surfaces of both of said strips which the anodizing fluid contacts directly and through said porous separators.

References Cited by the Examiner

UNITED STATES PATENTS

| 2,399,798 | 5/46 | Grouse et al. | 29—25.42 |
| 2,408,910 | 10/46 | Burnham | 204—38.1 |
| 2,504,178 | 4/50 | Burnham et al. | 204—38.1 |
| 2,668,936 | 2/54 | Robinson | 317—258 |
| 2,785,351 | 3/57 | Allison | 317—260 |
| 2,858,492 | 10/58 | Lamphier | 317—360 |
| 2,915,808 | 12/59 | Clemons | 29—25.42 |
| 2,932,153 | 4/60 | Bernard | 204—58 |

OTHER REFERENCES

Graham: Electroplating Engineering Handbook, 1955 edition, page 382.

WINSTON A. DOUGLAS, *Primary Examiner.*

THOMAS E. BEALL, LEON PEAR, RICHARD H. EANES, MURRAY TILLMAN, *Examiners.*